(12) United States Patent
Kamphus et al.

(10) Patent No.: US 12,491,548 B2
(45) Date of Patent: Dec. 9, 2025

(54) RECYCLING OF SUPERABSORBENT FIBERS WITH AN EXTENSIONAL FLOW DEVICE

(71) Applicant: The Procter & Gamble Company, Cincinnati, OH (US)

(72) Inventors: Juliane Kamphus, Schwalbach am Taunus (DE); Bruno Johannes Ehrnsperger, Bad Soden (DE); Arsen Arsenov Simonyan, Schwalbach am Taunus (DE); Dimitris Ioannis Collias, Mason, OH (US); John Andrew McDaniel, West Chester, OH (US); Martin Ian James, Hamilton, OH (US); Gary Wayne Gilbertson, Liberty Township, OH (US); Jose Carlos Garcia-Garcia, Cincinnati, OH (US); Jacqueline Besinaiz Thomas, Oregonia, OH (US); Yiping Sun, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 318 days.

(21) Appl. No.: 17/591,654

(22) Filed: Feb. 3, 2022

(65) Prior Publication Data

US 2022/0266322 A1    Aug. 25, 2022

Related U.S. Application Data

(60) Provisional application No. 63/151,911, filed on Feb. 22, 2021.

(51) Int. Cl.
  *B09B 3/70* (2022.01)
  *B09B 3/35* (2022.01)
  *B09B 3/80* (2022.01)
  *B09B 101/67* (2022.01)

(52) U.S. Cl.
  CPC .......... *B09B 3/70* (2022.01); *B09B 3/35* (2022.01); *B09B 3/80* (2022.01); *B09B 2101/67* (2022.01)

(58) Field of Classification Search
  CPC .... B09B 3/70; B09B 3/80; B09B 3/35; B09B 2101/67
  See application file for complete search history.

(56) References Cited

U.S. PATENT DOCUMENTS

| | | | |
|---|---|---|---|
| 5,244,934 A | 9/1993 | Umeda et al. | |
| 5,258,173 A | 11/1993 | Waterfield | |
| 5,338,537 A | 8/1994 | White, Jr. | |
| 5,618,003 A | 4/1997 | Akiyoshi | |
| 6,143,820 A | 11/2000 | Klier | |
| 8,383,746 B2 | 2/2013 | Torii | |
| 8,517,595 B2 | 8/2013 | Morrison, Jr. | |
| 8,952,116 B2 * | 2/2015 | Kobayashi | A61L 15/22 524/556 |
| 9,095,853 B2 | 8/2015 | Somma | |
| 9,156,034 B2 | 10/2015 | Somma | |
| 9,822,203 B2 | 11/2017 | Haag | |
| 9,850,192 B2 | 12/2017 | Harris et al. | |
| 10,881,555 B2 * | 1/2021 | Panayotova | B32B 7/14 |
| 11,154,839 B2 | 10/2021 | Collias et al. | |
| 11,319,670 B2 | 5/2022 | Konishi | |
| 11,396,587 B2 | 7/2022 | Banaszak Holl et al. | |
| 11,525,047 B2 | 12/2022 | Collias et al. | |
| 11,649,336 B2 | 5/2023 | Collias et al. | |
| 11,746,210 B2 | 9/2023 | Collias et al. | |
| 2004/0200138 A1 | 10/2004 | Parish | |
| 2004/0209753 A1 | 10/2004 | Kikushima et al. | |
| 2009/0003123 A1 | 1/2009 | Morrison, Jr. et al. | |
| 2011/0210469 A1 | 9/2011 | Keller | |
| 2013/0010569 A1 | 1/2013 | Gansmuller et al. | |
| 2013/0172180 A1 | 7/2013 | Naumann | |
| 2016/0101210 A1 * | 4/2016 | Watson | A61P 17/02 424/537 |
| 2017/0095792 A1 | 4/2017 | Kim et al. | |
| 2017/0166707 A1 | 6/2017 | Jang et al. | |
| 2017/0198105 A1 | 7/2017 | Lee et al. | |
| 2017/0245443 A1 | 8/2017 | Zhang et al. | |
| 2018/0171097 A1 | 6/2018 | Layman et al. | |
| 2018/0305518 A1 | 10/2018 | Simonyan et al. | |
| 2019/0249029 A1 * | 8/2019 | Gibanel | B05D 7/14 |
| 2021/0053028 A1 | 2/2021 | Collias et al. | |
| 2021/0054163 A1 | 2/2021 | Collias et al. | |
| 2021/0054164 A1 | 2/2021 | Banaszak Holl et al. | |
| 2021/0054165 A1 | 2/2021 | Simonyan | |

(Continued)

FOREIGN PATENT DOCUMENTS

| | | |
|---|---|---|
| CN | 102770251 A | 11/2012 |
| CN | 108822337 A | 11/2018 |

(Continued)

OTHER PUBLICATIONS

All Office Actions; U.S. Appl. No. 17/591,646, filed Feb. 3, 2022.
All Office Actions; U.S. Appl. No. 17/591,648, filed Feb. 3, 2022.
All Office Actions; U.S. Appl. No. 17/591,650, filed Feb. 3, 2022.
U.S. Appl. No. 17/591,646, filed Feb. 3, 2022, to first inventor Juliane Kamphus et al.
U.S. Appl. No. 17/591,648, filed Feb. 3, 2022, to first inventor Juliane Kamphus et al.
U.S. Appl. No. 17/591,650, filed Feb. 3, 2022, to first inventor Juliane Kamphus et al.
Caruso et al. "Mechanically-Induced Chemical Changes in Polymeric Materials", Chemical Reviews, vol. 109, Issue 11, Oct. 14, 2009, pp. 5755-5798.

(Continued)

*Primary Examiner* — Abbas Rashid
*Assistant Examiner* — Stephen M Russell
(74) *Attorney, Agent, or Firm* — Anna E. Haller; Sarah M. DeCristofaro

(57) ABSTRACT

Superabsorbent fiber (SAF) in a feed stream is converted into soluble polymers in an extensional flow device. The total energy used to degrade the SAF into soluble polymers is less than about 50 MJ/kg SAF.

20 Claims, No Drawings

(56) References Cited

U.S. PATENT DOCUMENTS

| | | |
|---|---|---|
| 2021/0197173 A1 | 7/2021 | Ahn |
| 2021/0388172 A1 | 12/2021 | Collias et al. |
| 2021/0388173 A1 | 12/2021 | Collias et al. |
| 2022/0212165 A1 | 7/2022 | Morita |
| 2022/0267559 A1 | 8/2022 | Kamphus et al. |
| 2023/0167265 A1 | 6/2023 | Simonyan |
| 2023/0366498 A1 | 11/2023 | Nowicki |

FOREIGN PATENT DOCUMENTS

| | | |
|---|---|---|
| EP | 1757646 A1 | 2/2007 |
| GB | 1013757 A | 12/1965 |
| GB | 2517121 A | 2/2015 |
| JP | H04317784 A | 11/1992 |
| JP | H04317785 A | 11/1992 |
| JP | H06313008 A | 11/1994 |
| JP | H09249711 A | 9/1997 |
| JP | 2001316519 A | 11/2001 |
| JP | 2003321574 A | 11/2003 |
| JP | 2004317319 A | 11/2004 |
| JP | 2012219038 A | 11/2012 |
| JP | 2019108640 A | 7/2019 |
| JP | 6574288 B1 | 8/2019 |
| JP | 2019131789 A | 8/2019 |
| JP | 2019137963 A | 8/2019 |
| WO | 2012140981 A1 | 10/2012 |
| WO | 2019151538 A1 | 8/2019 |
| WO | 2020217757 A1 | 10/2020 |
| WO | 2022081523 A1 | 4/2022 |
| WO | 2022098959 A1 | 5/2022 |

OTHER PUBLICATIONS

PCT Search Report and Written Opinion for PCT/US2022/017196 dated Jun. 21, 2022, 10 pages.

Li et al. "Ultraviolet-induced decomposition of acrylic acid based superabsorbent hydrogels crosslinked with N,Nmethylenebisacrylamide", Journal of Applied Polymer Science, vol. 108, Issue 6, Jun. 15, 2008, pp. 3435-3441.

Prajapat et al. "Intensification of depolymerization of polyacrylic acid solution using different approaches based on ultrasound and solar irradiation with intensification studies", Ultrasonics Sonochemistry, vol. 32, Issue 6, Sep. 1, 2016, pp. 290-299.

Shukla et al. "Photo, thermal, and ultrasonic degradation of EGDMA-crosslinked poly (acrylic acid-co-sodium acrylate-coacrylamide) superabsorbents", Journal of Applied Polymer Science, vol. 125, Issue 1, Jul. 5, 2012, pp. 630-639.

All Office Actions, U.S. Appl. No. 17/000,413, filed Aug. 24, 2020.
All Office Actions, U.S. Appl. No. 16/548,873, filed Aug. 23, 2019.
All Office Actions, U.S. Appl. No. 16/999,127, filed Aug. 21, 2020.
All Office Actions; U.S. Appl. No. 17/341,476, filed Jun. 8, 2021.
All Office Actions; U.S. Appl. No. 17/341,479, filed Jun. 8, 2021.
All Office Actions; U.S. Appl. No. 18/100,151, filed Jan. 23, 2023.

Basedow et al., "Ultrasonic Degradation of Polymers in Solution", Advances in Polymer Science, vol. 22, 1977, pp. 83-148.

Caruso et al., "Mechanically-Induced Chemical Changes in Polymeric Materials", Chem. Rev. 2009, vol. 109, pp. 5755-5798.

Dubinsky et al., "Thermal Degradation of poly(acrylic acid) Containing Copper Nitrate", Polymer Degradation and Stability, vol. 86, 2004, pp. 171-178.

Ebrahimi et al., "The Study of Ultrasonic Degradation of Superabsorbent Hydrogels", vol. 2012, Article ID 343768, 06 pages.

Gurkaynak et al., "High-Temperature Degradation of Polyacrylic Acid in Aqueous Solution", Journal of Polymer Science Part A: Polymer Chemistry, vol. 34, 1996, pp. 349-355.

Kaczmarek et al., "Photo-Oxidative Degradation of Some Water-Soluble Polymers in the Presence of Accelerating Agents", Die Angewandte Makromolekulare Chemie 261/262, 1998, pp. 109-121.

Le ' pine et al., "Thermal Degradation of Polyacrylic Acid in Dilute Aqueous Solution", Polymer Degradation and Stability, vol. 75, 2002, pp. 337-345.

Li et al., "Ultraviolet-Induced Decomposition of Acrylic Acid-Based Superabsorbent Hydrogels Crosslinked with N,N-Methylenebisacrylamide", Department of Chemistry and Chemical Engineering, Zhongkai University, Guangzhou, CN, Aug. 10, 2007, pp. 3435-3441.

Linden et al., "Photooxidative Degradation of Polymers by HO and HO2 Radicals Generated During the Photolysis of H2O2, FeCl3, and Fenton Reagents", Coordination Chemistry Reviews, 125 (1993) pp. 195-217.

McGaugh et al., "The Thermal Degradation of Poly(Acrylic Acid)", Polymer Letters, vol. 5, 1967, pp. 817-820.

McNeill et al., "Thermal Stability and Degradation Mechanisms of Poly(Acrylic Acid and its Salts: Part 1—Poly(Acrylic Acid)", Polymer Degradation and Stability, 29 (1990), pp. 233-246.

McNeill et al., "Thermal Stability and Degradation Mechanisms of Poly(Acrylic Acid) and its Salts: Part 2—Sodium and Potassium Salts", Polymer Degradation and Stability, vol. 30, 1990, pp. 213-230.

McNeill et al., "Thermal Stability and Degradation Mechanisms of Poly(Acrylic Acid) and its Salts: Part 3—Magnesium and Calcium Salts", Polymer Degradation and Stability, vol. 30, 1990, pp. 267-282.

Mierzwa et al., "UV-Hydrogen Peroxide Processes", Advanced Oxidation Processes for Wastewater Treatment, Chapter 2, University of Sao Paulo, Sao Paulo SP Brazil, 2018, 36 pgs.

Prajapat et al., "Intensification of Depolymerization of Polyacrylic Acid Solution Using Different Approaches Based on Ultrasound and Solar Irradiation with Intensification Studies", Ultrasonics Sonochemistry, vol. 32, 2016, pp. 290-299.

Saita et al., "Degradation of Sodium-Polyacrylate in Dilute Aqueous Solution II", Japanese Journal of Applied Physics, vol. 22, No. 8, Aug. 1983, pp. 1310-1314.

Shukla et al., "Ultrasonic Degradation of Poly(acrylic acid)", Journal of Applied Polymer Science, vol. 112, 2009, pp. 991-997.

Shukla et al., "Oxidative and Photooxidative Degradation of Poly(acrylic acid)", Polymer Degradation and Stability, vol. 94, 2009, pp. 1238-1244.

Shukla et al., "Photo, Thermal and Ultrasonic Degradation of EGDMA-Crosslinked Poly(acrylic acid-co-sodium acrylate-co-acrylamide) Superabsorbents", Journal of Applied Polymer Science DOI 10.1002, Dept. of Chemical Engineering, Indian Institute of Science, 2011, pp. 630-639.

* cited by examiner

RECYCLING OF SUPERABSORBENT FIBERS WITH AN EXTENSIONAL FLOW DEVICE

FIELD

The present disclosure generally relates to recycling of superabsorbent fibers (SAF) using an extensional flow device at short residence times, with optional and additional cavitation. More specifically, a feed stream comprising SAF is fed into the extensional flow device and a product stream is produced, which comprises essentially soluble polymers. The concentration of SAF in the feed stream is greater than about 1 wt %, and the total energy used to convert SAF to soluble polymers is less than about 50 MJ/kg SAF.

BACKGROUND

Recycling of absorbent hygiene products (AHPs) (i.e., baby diapers, feminine protection pads, and adult incontinence pads) is good for the environment and needed to achieve the sustainability goals of many consumer companies. These goals are about using 100% recycled materials and having zero consumer and manufacturing waste go to landfill. In addition to these goals, successful recycling benefits the environment, stimulates the economy, improves people's health and water quality, and generates energy needed by consumers in developing regions of the world.

The major component in AHPs is typically the superabsorbent polymer (SAP), whereas other components are adhesives, cellulose fibers, polyethylene, polypropylene, and polyester. SAP is a water-absorbing, water-swellable, and water-insoluble powdered solid which is a crosslinked and partially neutralized homopolymer of glacial acrylic acid. SAP has an exceptionally high ability to absorb aqueous liquids, such as contaminated water or urine. An alternative to poly(acrylic acid) based SAP are superabsorbent fibers (SAF). These fibers generally comprise a relatively large amount of comonomers (when compared with superabsorbent polymer particles). Therefore, similar to SAF, there is also a need to recycle SAF used in AHPs.

Recycling of AHPs involves cleaning of the AHPs from the soils accumulated during their use and separating the various components into recycled material streams. More specifically, the recycled SAF material stream can be used in applications less demanding than AHPs (since the recycled SAF has inferior properties compared to virgin SAF; for example, agricultural or horticultural water-retaining agents, and industrial waterproofing agents) and/or can be converted to essentially non-crosslinked, and slightly branched or linear soluble polymers. These soluble polymers can be used as a feed material to various applications. For example, the soluble polymers can be: 1) used as-is in applications such as water treatment or corrosion inhibition; or 2) esterified and then used in adhesives, coatings, etc.; or 3) used as-is in SAF making such as SAF fiber spinning or 4) transformed into SAF (see item 3)) and blended with virgin SAF. The first two sets of applications are part of the effort to recycle SAF into other products by replacing virgin compounds with compounds derived from recycled SAF, whereas the last two sets of applications are part of the circular economy of SAF, i.e., recycling SAF back to SAF. In all cases, the objective is to achieve the same properties as virgin materials.

While no references have been identified to address degradation of SAF not purely based on acrylic acid, non-limiting examples of processes that produce purified and separated material streams of used SAF from recycled AHPs are disclosed and claimed in U.S. Pat. No. 9,095,853 B2, issued on Aug. 4, 2015; and 9,156,034 B2, issued on Oct. 13, 2015; both assigned to Fater S.p.A, based in Pescara, Italy.

Most SAPs are based on poly(acrylic acid) and are crosslinked network materials. Non-limiting examples of procedures used to produce SAPs from glacial acrylic acid and crosslinkers are disclosed in U.S. Pat. No. 8,383,746 B2, issued on Feb. 26, 2013, and assigned to Nippon Shokubai Co., Ltd, based in Osaka, Japan; and U.S. Pat. No. 9,822,203 B2, issued on Nov. 21, 2017, and assigned to BASF SE, based in Ludwigshafen, Germany.

Ultrasonic degradation of SAP is described in: (1) Ebrahimi, R., et al., Organic Chemistry Intl, 2012, Article ID 343768, 5 pages; and (2) Shukla, N. B., and Madras, G., *J. Appl. Polym. Sci.*, 125 (2012), 630-639. Ultrasonic degradation of PAA is described in: (1) Shukla, N. B., et al., *J. Appl. Polym. Sci.*, 112 (2009), 991-997; and (2) Prajapat, A. L., and Gogate, P. R., *Ultrason. Sonochem.*, 32 (2016), 290-299. Also, a general description of ultrasonic degradation of polymers in solution is given in: Basedow, A. M., and Ebert, K. H., *Adv. Polym. Sci.*, 22 (1977), 83-148.

For the degradation of SAPs, both references used viscosity as a measure of the degradation level and found that it takes about 5 to 10 min to reduce the viscosity by one order of magnitude, e.g. from 10 Pa·s to 1 Pa·s, which indicates that a lot of energy is needed to achieve that level of degradation. For the degradation of linear polymers, the main themes from these references (as well as other references that report on the use of UV, thermal, and other forms of energy) are that the (1) preferential scission is at the mid-point of the polymer chain, (2) the higher molecular weight chains are degraded at a higher rate than the lower molecular weight chains, and (3) there is a minimum molecular weight below which degradation or de-polymerization does not occur. In all cases, the ultrasonic degradation of polymers is due to cavitation, and fast growth and collapse of the resulting microbubbles.

Accordingly, there is a need to recycle AHPs and their major component, which can be SAF. For the recycling of SAF, there is a need to degrade SAF into soluble polymers, in short time scale; with low energy and power per unit mass of SAF; and at mild conditions, such as room temperature, thus avoiding chemical decomposition such as decarboxylation of the degraded SAF. The requirement for low energy per unit mass of SAF stems from the fact that the recycling of used SAF and its degradation to soluble polymers is beneficial only if the energy spent during the converting of SAF to soluble polymers is less than, e.g., that used to make fossil-derived soluble polymers of same kind. For acrylic acid (petro-AA) from propylene, the required energy is about 50 MJ/kg AA. The soluble polymers produced from SAF can then be incorporated back into virgin SAF (thus increasing its recycled content and supporting the circular economy of SAF) and/or derivatized into materials for other applications, such as, adhesives, coatings, water treatment, fabric care, etc.

SUMMARY

In one embodiment of the present disclosure, a method for degrading superabsorbent fibers (SAF) to soluble polymers is presented, wherein the soluble polymers comprise from 5 weight-% to 75 weight-% of polymerized acrylic acid monomer units, preferably from 10 weight-% to 75 weight-%, or from 10 weight-% to 70 weight-% based on the total weight of the soluble polymers. As used herein, the term "acrylic acid monomer units" excludes derivatives of acrylic acid monomers, such as esters and amides, and also excludes methacrylic acid monomer units and salts thereof.

The method comprises flowing a feed stream comprising the SAF into an inlet of an extensional flow device and producing a product stream comprising the soluble polymers at an outlet of the extensional flow device; wherein the feed stream comprises the SAF at a concentration greater than about 1 wt %; wherein the feed stream has a residence time in the extensional flow device of less than about 120 s; and wherein the degradation of the SAF to the soluble polymers requires a total energy of less than about 50 MJ/kg SAF.

Furthermore, a method for degrading superabsorbent fibers (SAF) to soluble polymers is presented, wherein the soluble polymers comprise from 5 weight-% to 75 weight-% of polymerized acrylic acid monomer units preferably from 10 weight-% to 75 weight-%, or from 10 weight-% to 70 weight-% based on the total weight of the soluble polymers. The method comprises flowing a feed stream comprising the SAF into an inlet of an extensional flow device and producing a product stream comprising the soluble polymers at an outlet of the extensional flow device; wherein the feed stream comprises water and the SAF at a concentration greater than about 1 wt %; wherein the feed stream has a residence time in the extensional flow device of less than about 120 s; wherein the degradation of the SAF to the soluble polymers requires a total energy of less than about 16 MJ/kg SAF; and wherein the soluble polymers have a weight-average molecular weight less than about 1,000,000 g/mol.

Still further, a method for degrading superabsorbent polymer (SAF) to soluble polymers is presented, wherein the soluble polymers comprise from 5 weight-% to 75 weight-% of acrylic acid, preferably from 10 weight-% to 70 weight-% based on the total weight of the soluble polymers. The method comprises flowing a feed stream comprising the SAF into an inlet of an extensional flow device and producing a product stream comprising the soluble polymers at an outlet of the extensional flow device; wherein the feed stream comprises water and the SAF at a concentration greater than about 5 wt %; wherein the feed stream has a residence time in the extensional flow device of less than about 120 s; wherein the degradation of the SAF to the soluble polymers requires a total energy of less than about 16 MJ/kg SAF; and wherein the soluble polymers have a weight-average molecular weight less than about 1,000,000 g/mol.

The soluble polymers may be water-soluble. The soluble polymers preferably have a solubility in water at 25° C. of more than 5 g of soluble polymer per 100 g water, or more than 15 g of soluble polymer per 100 g water, or from 20 g to 120 g of soluble polymer per 100 g water or from 35 g to 100 g of soluble polymer per 100 g water.

The soluble polymers obtained by the method of the present disclosure can be subjected to the NMR Content Method set out below. The NMR Content Method can be used to determine the ratio on a molar basis of protons of functional groups with different NMR signals such as alkene terminal moieties, alkoxy groups (—O—CHR1- with R1 one of the group H, alkyl, aryl, heteroaryl, alkoxy or halogene), aliphatic groups (—CHR1- with R1 one of the group H, alkyl, aryl, heteroaryl or halogene) and/or other 1H-NMR active groups. The NMR Content Method also enables the determination of many monomer units other than acrylic acid monomer units, which are comprised in the soluble polymers, given that the spectra obtained by the NMR Content Method allow the determination of various functional groups due to their different NMR signals.

The soluble polymers obtained by the method of the present disclosure may have a ratio 3.6:CH of at least 0.04, as determined by the NMR Content Method described herein. The soluble polymers may have a ratio 3.6:CH of at least 0.1, or at least 0.2 as determined by the NMR Content Method described herein. The soluble polymers may have a ratio 3.6:CH of not more than 0.7 as determined by the NMR Content Method described herein.

The soluble polymers obtained by the present disclosure may have a content "%3.6 ppm" of at least 5%, as determined by the NMR Content Method described herein. The soluble polymers may have a content "%3.6 ppm" of at least 10%, or at least 15%, as determined by the NMR Content Method described herein. The soluble polymers may have a content "%3.6 ppm" of not more than 75%, as determined by the NMR Content Method described herein.

The soluble polymers obtained by the method of the present disclosure may have a content of alkene, "% alkene", of not more than 0.31%, as determined by the NMR Content Method described herein.

DETAILED DESCRIPTION

I Definitions

As used herein, the term "SAF" refers to superabsorbent fibers. The SAF of the present disclosure are capable of absorbing a 0.9 wt % saline solution at 25° C. at least 7 times their dry weight as measured using the Centrifuge Retention Capacity (CRC) test method as described herein, preferably at least 10 times their dry weight. The typical absorption mechanism is osmotic pressure. SAF that absorbs water or aqueous solutions becomes softer and gel-like.

"Superabsorbent fiber" ("SAF") is used herein to refer to superabsorbent polymer material that is in a fibrous form. The superabsorbent fibers have a length and a cross-section. The length is the largest dimension of the fiber when the fiber is or would be laid flat and straight on a surface, such that curves or crimps in the fiber disappear and the fiber becomes an approximately rod-like form. The cross-section is orthogonal to the length. For purposes herein, a fiber is a material that has a largest dimension and smallest dimension, wherein the ratio of largest dimension to smallest dimension is at least 10:1, preferably at least 15:1, even more preferably at least 20:1, i.e. the largest dimension of the superabsorbent fiber (also called the length) is at least 10 times, or at least 15 times, or at least 20 times the smallest dimension of the fiber (also called width). If a superabsorbent fiber has a cross-section that varies along the length of the fiber, the largest dimension of the cross-section (determined along the length of the fiber) is taken as the width of the fiber when calculating the ratio of largest dimension to smallest dimension. As used herein, the term "soluble polymers" refers to an essentially non-crosslinked, and either slightly branched or linear polymer, the polymer comprising from with 5 weight-% to 75 weight-%, or from 10 weight-% to 75 weight-%, or from 10 weight-% to 70 weight-% of acrylic acid as the monomeric unit and degree of polymerization that can be 2 or higher. For the purposes of the present disclosure, for soluble polymers there will be no difference between a polymer and an oligomer.

As used herein, the term "degradation" refers to the conversion of SAF into soluble polymers via the actions of partial de-polymerization, de-crosslinking, molecular backbone breaking, or any combination of the above actions. For the purposes of the present disclosure, the terms degradation, recycling, and conversion are used interchangeably, as long as they refer to the transformation of SAF to soluble polymers. Also, the degradation essentially preserves the carboxylic groups of the SAF and thus the product soluble polymers contains those carboxylic groups. Note that full de-polymerization of SAF should lead to the monomers that were comprised by the SAF.

As used herein, the term "virgin SAF" refers to SAF produced from virgin monomers, which is the feedstock used today to make SAF. Virgin monomers can be produced from either fossil-derived materials or bio-derived materials (non-limiting examples of bio-materials are: lactic acid, 3-hydroxypropionic acid, glycerin, bio-propylene, carbon dioxide, and sugar). Virgin SAF does not include any recycled SAF above about 1 wt %.

As used herein, the term "used SAF" refers to SAF which has already been produced industrially and/or used commercially, for example, in a baby diaper, feminine pad, adult incontinence pad, or other articles and/or uses. Used SAF can be post-consumer SAF, post-industrial SAF, or combinations of both. Unless otherwise noted in this disclosure, SAF refers to either "used SAF" or "virgin SAF".

As used herein, the term "degraded SAF" refers to SAF which has been degraded to soluble polymers. For the purposes of the present disclosure, the terms "degraded SAF" and "soluble polymers" are used interchangeably.

As used herein, the term "recycled SAF" refers to SAF which contains at least 1 wt % degraded SAF (or equivalently, soluble polymers) that has been incorporated into the SAF while the SAF is being produced from acrylic acid and co-monomers using the typical production method. Thus, the recycled SAF is a blend of virgin SAF and at least 1 wt % degraded SAF.

As used herein, the term "feed stream" refers to a body of fluid that flows in a specific direction and feeds into an inlet of an extensional flow device.

As used herein, the term "product stream" refers to a body of fluid that is produced at an outlet of an extensional flow device when the feed stream is fed into an inlet of the same device.

As used herein, the term "Liquid Whistle" refers to a Sonolator type of equipment (manufactured by the Sonic Corporation, Stratford, CT) which employs, in the flow direction, an inlet chamber, an orifice, and a mixing chamber with a blade in front of the orifice. Material flows through the orifice and the generated jet impinges on the blade which is then forced to vibrate at its resonant frequency and further enhance the cavitation field, if it is located within 7 to 8 times the hydraulic diameter of the orifice away from the orifice (i.e., the blade is engaged). If the blade is located outside the range of 7 to 8 times the hydraulic diameter of the orifice away from the orifice, then it is considered that the blade is not engaged. The closer to the orifice the blade is and the lower the viscosity of the feed stream is the stronger the cavitation is. The main uses of the Liquid Whistle (LW) are mixing, emulsification, deagglomeration, and disinfection in the home, personal care, and fine chemicals industries (U.S. Pat. No. 8,517,595 B2 and Ryan, D. J., et al., Chem. Engng Sci., 189 (2018), 369-379). For the purposes of the present disclosure, LW is one of the extensional flow devices that can be used.

As used herein, the term "extensional flow device" refers to a flow device that generates extensional flow, strain, and stress. Non-limiting examples of extensional flow devices are devices with converging and/or diverging channels, orifices, impinging jets, four roll mills, screens, dies, etc. The terms "extensional" and "elongational" are used interchangeably herein.

As used herein, the terms "viscosity ratio" or "viscosity reduction ratio" refer to the ratio of the viscosity of the product stream to that of the feed stream. The viscosity of the feed stream is typically measured with a parallel plate fixture in oscillatory mode, and the complex viscosity reported typically corresponds to a frequency of 1 rad/s. The real and imaginary part of the complex viscosity represent the dynamic viscosity and the storage viscosity, respectively. For calculating the viscosity ratio we use the dynamic viscosity i.e. the real part of the complex viscosity. The viscosity of the product stream is measured with either a cup and bob fixture in steady mode or parallel plate fixture in oscillatory mode. When the viscosity is measured with a cup and bob fixture in steady mode the viscosity reported typically corresponds to a shear rate of 4 $s^{-1}$. These viscosity measurement techniques are well known to those skilled in the art. For the purposes of the present disclosure, the negative of the decadic logarithm of the viscosity ratio indicates the extent of the SAF degradation to soluble polymers in orders of magnitude, as it is accepted by those skilled in the art that the lower the viscosity of a soluble polymers solution the lower the molecular weight of the soluble polymers is, at a fixed concentration.

As used herein, $M_n$ is the number average molecular weight, in g/mol or equivalently Da, $M_w$ is the weight average molecular weight, in g/mol or equivalently Da, $M_z$ is the z-average molecular weight, in g/mol or equivalently Da, and PDI is the polydispersity index defined as $M_w/M_n$.

"Disposable" is used in its ordinary sense to mean an article that is disposed or discarded after a limited number of usage over varying lengths of time, for example, less than 20 usages, less than 10 usages, less than 5 usages, or less than 2 usages. If the disposable absorbent article is a diaper, a pant, sanitary napkin, sanitary pad or wet wipe for personal hygiene use, the disposable absorbent article may (and most often is) intended to be disposed after single use.

II Feed Stream

Unexpectedly, it has been found that SAF degrades to soluble polymers (i.e., essentially, without decarboxylation) when the SAF feed stream (which is in the form of a gel) flows in the extensional flow device (e.g. LW) and experiences the extensional flow at short residence times. Without wishing to be bound by any theory, applicants believe that the extensional stresses generated in the SAF feed stream/gel, as it flows through the orifice, cause stretching and breaking of the cross-linker, cross-linker attachments to the backbone, and backbone bonds. Applicants expected that gels would generate slip at the walls of the inlet chamber and orifice, and thus they would not generate extensional stresses as they would flow in plug flow in the inlet chamber and orifice (as it is well known to those skilled in the art).

The typical properties of SAF are mechanical properties, swelling capacity, and centrifuge retention capacity (CRC) as measured according to the test method set out herein. Also, the SAF includes from more than 25 weight-% to less than 95 weight-% of other co-monomers (i.e. other than acrylic acid). Suitable co-monomers are monomeric groups e.g. comprised of/consisting of methyl acrylate, methyl methacrylate, ethyl (meth) acrylate 2-ethyl hexyl (meth) acrylate, or polyacrylamides, polyvinyl alcohol, ethylene maleic anhydride copolymers, polyvinyl ethers, hydroxypropylcellulose, polyvinlmorpholinone, and polymers and copolymers of vinyl sulfonic acid, polyvinyl amines, polyallylamines, polyvinylpyrridine, and the like. Other suitable polymers in SAF include hydrolyzed acrylonitrile grafted starch, acrylic acid grafted starch, and isobutylene maleic anhydride copolymers and mixtures thereof. The SAF are crosslinked to render the material substantially water insoluble. Preferred monomers are methyl (meth) acrylate, and/or monomers comprising a hydroxylic group, e.g. hydroxyalkyl (meth) acrylates, e.g. hydroxyethyl methacrylate, tripropyleneglycol mono acrylate, glyceryl monoacrylate etc. The SAF can comprise/consist of polymers formed of two kinds of monomers (including acrylic acid) or more preferably of three or more kinds of monomers.

The SAF may have a sodium level as amount of Na in wt % greater than about 8 wt %, or a sodium level as amount of Na in wt % of from 10 wt % to 20 wt %, or from 15 wt % to 18 wt %. In yet another embodiment, the SAF has or a sodium level as amount of Na in wt % below 12 wt %.

The SAF provided in the method may be i) in the form of loose fibers or may be ii) in the form of a nonwoven web, or may be a combination of i) and ii). If the SAF are in the form of a nonwoven web, the nonwoven web may consist of SAF or may comprise SAF. A nonwoven web comprising SAF and provided in the method may comprise at least 50 weight-% of SAF based on the total weight of the nonwoven web, or may comprise at least 60 weight-%, or at least 70 weight-%, or at least 80 weight-%, or at least 90 weight-% of SAF based on the total weight of the nonwoven web.

The nonwoven web may further comprise further components such as synthetic fibers, natural fibers (e.g. cellulose fibers), or combinations thereof. Synthetic fibers that may be comprised by such nonwoven webs may be polyolefin fibers (e.g. polyethylene, polypropylene, or combinations thereof), or PET fibers, or combinations of polyolefin and PET fibers.

The non-SAF components of the nonwoven web may be removed prior to subjecting the SAF to the method of the present disclosure, however, this does not need to be the case. Instead, the nonwoven web comprising the SAF may be subjected to the method of the present disclosure (as complete nonwoven web, cut, shred or milled) together with the non-SAF components of the nonwoven web.

Prior to or during the method of the present disclosure, the nonwoven web may be cut into pieces or may be milled or otherwise shred to make the SAF more accessible to the oxidated water-soluble salt. Alternatively, the nonwoven web is subjected "as is" to the method.

The non-SAF components of the nonwoven web may be removed prior to subjecting the SAF to the method of the present disclosure, however, this does not need to be the case. Instead, the nonwoven web comprising the SAF may be subjected to the method of the present disclosure (as complete nonwoven web, cut, shred or milled) together with the non-SAF components of the nonwoven web.

In one embodiment, the feed stream comprises SAF. In another embodiment, the feed stream comprises SAF and water. In yet another embodiment, the feed stream comprises SAF and ethylene glycol (EG). In even yet another embodiment, the feed stream comprises SAF, water, and ethylene glycol. The water in the feed stream can be RO water, regular tap water, or water containing dissolved inorganic salts at various salt concentrations. A non-limiting example of water with salt is a 0.9 wt % solution of sodium chloride. Other salts with monovalent cations, but higher ionic strength, can be used to reduce the viscosity of the feed stream or alternatively to enable higher SAF concentration to be used. A non-limiting example of a viscosity reducing salt is sodium sulfate.

The feed stream can also comprise any free radical producing chemical compound. Non-limiting examples of such chemical compounds are hydrogen peroxide ($H_2O_2$), persulfate (such as, sodium persulfate or potassium persulfate), perborate, perphosphate, percarbonate, diazo compounds, ozone, organic free radical initiators (e.g. di-ter-butyl peroxide (DTBP)), combinations thereof, etc.

In one embodiment, the feed stream comprises SAF and $H_2O_2$. In another embodiment, the feed stream comprises SAF and a $H_2O_2$ solution.

In one embodiment, the feed stream comprises SAF at a concentration greater than about 1 wt %. In another embodiment, the feed stream comprises SAF at a concentration greater than about 5 wt %. In yet another embodiment, the feed stream comprises SAF at a concentration greater than about 10 wt %. In even yet another embodiment, the feed stream comprises SAF at a concentration of about 2.5 wt %. In one embodiment, the feed stream comprises SAF at a concentration of about 5 wt %.

In one embodiment, the feed comprises SAF and a $H_2O_2$ solution, and the concentration of the SAF is about 2.5 wt %, the concentration of the $H_2O_2$ solution is 97.5 wt %, and the concentration of the $H_2O_2$ in the $H_2O_2$ solution is less than about 3 wt %. In another embodiment, the feed comprises SAF and a $H_2O_2$, and the concentration of the SAF is about 5 wt %, the concentration of the $H_2O_2$ solution is about 95 wt %, and the concentration of the $H_2O_2$ in the $H_2O_2$ solution is less than about 3 wt %. In yet another embodiment, the feed comprises SAF and a $H_2O_2$ solution, and the concentration of the SAF is about 2.5 wt %, the concentration of the $H_2O_2$ solution is 97.5 wt %, and the concentration of the $H_2O_2$ in the $H_2O_2$ solution is about 3 wt %. In another embodiment, the feed comprises SAF and a $H_2O_2$, and the concentration of the SAF is about 5 wt %, the concentration of the $H_2O_2$ solution is about 95 wt %, and the concentration of the $H_2O_2$ in the $H_2O_2$ solution is about 3 wt %.

In one embodiment, the feed comprises SAF and a $H_2O_2$ solution, and the concentration of the SAF is about 2.5 wt %, the concentration of the $H_2O_2$ solution is 97.5 wt %, and the concentration of the $H_2O_2$ in the $H_2O_2$ solution is about 0.3 wt %. In another embodiment, the feed comprises SAF and a $H_2O_2$, and the concentration of the SAF is about 5 wt %, the concentration of the $H_2O_2$ solution is about 95 wt %, and the concentration of the $H_2O_2$ in the $H_2O_2$ solution is about 0.3 wt %. In yet another embodiment, the feed comprises SAF and a $H_2O_2$ solution, and the concentration of the SAF is about 2.5 wt %, the concentration of the $H_2O_2$ solution is 97.5 wt %, and the concentration of the $H_2O_2$ in the $H_2O_2$ solution is about 0.03 wt %. In another embodiment, the feed comprises SAF and a $H_2O_2$, and the concentration of the SAF is about 5 wt %, the concentration of the $H_2O_2$ solution is about 95 wt %, and the concentration of the $H_2O_2$ in the $H_2O_2$ solution is about 0.03 wt %.

In one embodiment, the feed comprises SAF and a $H_2O_2$ solution, and the concentration of the $H_2O_2$ in the $H_2O_2$ solution is less than about 3 wt %. In another embodiment, the feed comprises SAF and $H_2O_2$, and the concentration of the $H_2O_2$ in the $H_2O_2$ solution is less than about 0.3 wt %. In yet another embodiment, the feed comprises SAF and $H_2O_2$ solution, and the concentration of the $H_2O_2$ in the $H_2O_2$ solution is less than about 0.03 wt %.

The viscosity of the feed stream is typically measured with a parallel plate fixture in oscillatory mode, and the complex viscosity reported typically corresponds to a frequency of 1 rad/s. Depending on the SAF concentration the complex viscosity of the feed stream can be higher than 200 Pa·s (or equivalently, 200,000 cP). The feed stream can be in the form of a solution or gel, depending on the concentration of SAF.

The non-renewable energy use (NREU) to make acrylic acid (AA) from the fossil-derived propylene is estimated to be about 50 MJ/kg AA. Therefore, any successful recycling attempt of SAF desirably expends less energy than the NREU to make AA, i.e., less than about 50 MJ/kg SAF for competing environment friendly and commercially with fossil-derived virgin materials. For the purposes of the NREU, it is assumed that the SAF is fully non-neutralized (DN=0).

III Extensional Flow Device and Cavitation

Typically, the feed stream is in fluid communication with the extensional flow device via a tube or a channel, and a pump. Non-limiting examples of tubes or channels are glass tubes, metal tubes, alloy tubes (such as, stainless-steel tubes), and polymer tubes. The tube or channel can have any cross-sectional shape, such as, circular, rectangular, oval, rhombic, etc. Also, the size of the cross-sectional area of the tube or channel can be the same or vary along the flow direction. A non-limiting example of a varying cross-sectional shape of a tube is an undulating tube that can cause the feed stream to experience extensional stresses as it flows down the tube. These extensional stresses might be beneficial to the degradation of the SAF that is part of the feed stream. Also, the feed stream can go through static mixers or other mixing elements placed inside the tube and/or channel that the feed stream flows through.

Non-limiting examples of pumps are centrifugal pumps (such as, axial, radial, and mixed flow pumps) and positive displacement pumps (such as, reciprocating, rotary, piston, diaphragm, gear, peristaltic, screw, and vane). The extensional flow device can employ one or more pumps.

In one embodiment, the extensional flow device is a Liquid Whistle (LW). Typically, a LW includes, in the flow direction, an inlet chamber, an orifice, and a mixing chamber, where a blade is located in front of the orifice and at a distance from it. Also, typically, an extensional flow device includes an inlet and an outlet. The feed stream enters the extensional flow device at the inlet and the product stream exits the extensional flow device at the outlet. Non-limiting examples of extensional flow devices are the SONOLATOR® from Sonic Corp. and MICROFLUIDIZER® from Microfluidics Corp (Newton, MA). In one embodiment, there is no blade downstream of the orifice in the LW.

Non-limiting configurations of the orifice are slot-shaped, eye-shaped, elliptically-shaped, circular, triangular, square, rectangular, and polygonal. The width of the orifice can be up to 1 in. (2.541 cm) or more. The height of the orifice can be up to 0.5 in. (1.27 cm) or more. In another embodiment, the orifice is elliptically-shaped. In yet another embodiment, the width of the orifice is about 1.9 mm and the height of the orifice is about 0.6 mm. Non-limiting examples of the materials used to make the orifice housing are stainless steel, titanium, ceramics, cemented tungsten carbide, various borides, various carbons, various carbides, and various diborides. The land length of the orifice can be up to 10 mm. In one embodiment, the land length of the orifice is between about 0.5 mm and about 5 mm. In another embodiment, the land length of the orifice is about 1 mm.

When the blade of a LW vibrates with its natural frequency it generates intense cavitation and the formed bubbles grow and collapse extremely fast. Non-limiting examples of the materials used to make the blade are stainless steel, titanium, ceramics, cemented tungsten carbide, various borides, various carbons, various carbides, and various diborides. The blade of a LW can have suitable configurations, such as, but not limited to, tapered, with sharpened edge or edges, rectangular or square cross section, etc. The blade of a LW can have any suitable dimensions. In one embodiment, the length of the blade of a LW is between about 1 mm and about 100 mm. In another embodiment, the length of the blade of a LW is between about 10 mm and about 50 mm. In yet another embodiment, the thickness of the blade of a LW is between about 7 μm and about 100 mm. In another embodiment, the thickness of the blade of a LW is between about 0.2 mm and about 50 mm.

The cavitation introduced by the vibrating blade of a LW can be hydrodynamic, acoustic (e.g. between 20 Hz and 20 kHz), or ultrasonic (e.g. above 20 kHz). In one embodiment, the blade of a LW undergoes ultrasonic vibration at a frequency between about 20 kHz and about 100 kHz.

The distance between the blade and the orifice of a LW can vary from about 0.1 mm to about 25 mm. In one embodiment, the distance between the blade and the orifice of a LW is about 0.5 mm. In another embodiment, the distance between the blade and the orifice of a LW is between about 0.5 mm and about 13 mm. In yet another embodiment, the distance between the blade and the orifice of a LW is between about 1 mm and about 10 mm. In even yet another embodiment, the distance between the blade and the orifice of a LW is between about 3 mm and about 6 mm.

In one embodiment, the blade is at a distance from the orifice of a LW so that no cavitation is achieved when the fluid jet emerges from the orifice and impinges onto the blade. In another embodiment, the blade is at a distance from the orifice of a LW so that cavitation is achieved when the fluid jet emerges from the orifice and impinges onto the blade. In yet another embodiment, the cavitation achieved in the extensional flow device is hydrodynamic. In even yet another embodiment, the cavitation achieved in the extensional flow device is ultrasonic. In one embodiment, the cavitation achieved in the extensional flow device is acoustic.

In one embodiment, the distance of the blade from the orifice of a LW is at least about 7 times the hydraulic diameter of the orifice. In another embodiment, the distance of the blade from the orifice of a LW is less than about 7 times the hydraulic diameter of the orifice. In yet another embodiment, the distance of the blade from the orifice of a LW is about 6 times the hydraulic diameter of the orifice. In even yet another embodiment, the distance of the blade from the orifice of a LW is at about 0.3 times the hydraulic diameter of the orifice.

The process may be carried out at any suitable pressure, which is measured at the feed stream and upstream of the orifice. In one embodiment, the pressure is between about 500 psi (34.5 bar) and about 20,000 psi (1379 bar). In another embodiment, the pressure is higher than about 20,000 psi (1379 bar). In yet another embodiment, the pressure is between about 1000 psi (68.9 bar) and about 10,000 psi (689.5 bar). In even yet another embodiment, the pressure is between about 2,000 psi (137.9 bar) and about 7,000 psi (482.6 bar). In one embodiment, the pressure is about 5,000 psi (344.7 bar).

The flowrate of the feed stream into the extensional flow device can be of any suitable value. In one embodiment, the flowrate of the feed stream into the extensional flow device is between about 1 L/min and about 1,000 L/min. In another embodiment, the flowrate of the feed stream into the extensional flow device is between about 2 L/min and about 500 L/min. In yet another embodiment, the flowrate of the feed stream into the extensional flow device is between about 3 L/min and about 200 L/min. In even yet another embodiment, the flowrate of the feed stream into the extensional flow device is between about 4 L/min and about 100 L/min. In one embodiment, the flowrate of the feed stream into the extensional flow device is about 5 L/min.

The residence time of the feed stream in the extensional flow device can be of any suitable value. The residence time is defined as the average time the feed stream spends in the extensional flow device as a whole, not only in the orifice nor in the inlet and mixing chambers only. In one embodiment, the residence time of the feed stream in the extensional flow device is less than about 120 s. In another embodiment, the residence time of the feed stream in the extensional flow device is less than about 60 s. In yet another embodiment, the residence time of the feed stream in the extensional flow device is less than about 15 s. In one embodiment, the residence time of the feed stream in the extensional flow device is between about 1.5 s and about 50 s. In another embodiment, the residence time of the feed stream in the extensional flow device is between about 2 s and about 20 s. In yet another embodiment, the residence time of the feed stream in the extensional flow device is between about 2.5 s and about 10 s. In even yet another embodiment, the residence time of the feed stream in the extensional flow device is between about 3 s and 5 s.

The residence time of the feed stream in the orifice of the extensional flow device can be of any suitable value. In one embodiment, the residence time of the feed stream in the orifice is between about 1 ms and about 100 ms. In another embodiment, the residence time of the feed stream in the orifice is between about 2 ms and about 50 ms. In yet another embodiment, the residence time of the feed stream in the orifice is between about 5 ms and about 20 ms. In even yet another embodiment, the residence time of the feed stream in the orifice is between about 7 ms and about 15 ms. In one embodiment, the residence time of the feed stream in the orifice is about 11 ms.

The total energy is the electric energy that is supplied to the extensional flow device and is based on the voltage and amperage of the device, and the residence time of the feed stream. The specific energy is the energy that is dissipated in the feed stream inside the extensional flow device, it is used to convert SAF to soluble polymers, and is based on the pressure drop in the feed stream as it flows through the extensional flow system. The calculations for the total energy and specific energy are exemplified in the Methods section VII (as they are well known to those skilled in the art).

In one embodiment, the specific energy used to convert SAF to soluble polymers is less than about 30 MJ/kg SAF. In another embodiment, the specific energy used to convert SAF to soluble polymers is less than about 20 MJ/kg SAF. In yet another embodiment, the specific energy used to convert SAF to soluble polymers is less than about 10 MJ/kg SAF. In even yet another embodiment, the specific energy used to convert SAF to soluble polymers is less than about 5 MJ/kg SAF. In one embodiment, the specific energy used to convert SAF to soluble polymers is less than about 1 MJ/kg SAF.

In one embodiment, the total energy used to convert SAF to soluble polymers is less than about 50 MJ/kg SAF. In another embodiment, the total energy used to convert SAF to soluble polymers is less than about 32 MJ/kg SAF. In yet another embodiment, the total energy used to convert SAF to soluble polymers is less than about 16 MJ/kg SAF. In even yet another embodiment, the total energy used to convert SAF to soluble polymers is less than about 10 MJ/kg SAF. In one embodiment, the total energy used to convert SAF to soluble polymers is less than about 2 MJ/kg SAF.

The extensional flow can take place at room temperature or any other temperature. Furthermore, the extensional flow can be preceded or followed by other degradation processes, such as microwave heating, UV irradiation, IR heating, ultrasonic/cavitation, extrusion, extensional stretching, etc.

The extensional flow can also take place simultaneously with oxidative, enzymatic, or biological degradation.

Oxidative Degradation Method

Unexpectedly, it has been found that SAF can be degraded into soluble polymers, especially in the form of polymers comprising acrylic acid by mixing the SAF with an oxidative water-soluble salt (herein after referred to as "salt"). The salt comprises at least one cation and at least one anion. The SAF and salt are mixed with an aqueous carrier, such as water or physiological saline.

By heating the mixture to a temperature of from 30° C. to 200° C. degradation of the SAF starts, supposedly via radical decomposition caused by decomposition of the oxidative salt into radicals and/or radical ions. The elevated temperature may be at least 35° C., or at least 40° C., or at least 50° C., or at least 60° C., or at least 70° C., or at least 80° C. The elevated temperature may be less than 190° C., or less than 180° C., or less than 150° C. Generally, at elevated temperatures exceeding 200° C., the SAF starts to break down and decay in an uncontrolled manner, which is not desirable.

Without wishing to be bound by theory, it is believed that upon heating the oxidative salt forms radicals or radical ions via decomposition. The radicals or radical ions lead to hydrogen abstraction from the water, or the aqueous carrier, resulting in hydroxylradicals, or directly from the SAF. The hydroxylradicals can abstract hydrogen from the SAF. After hydrogen abstraction from the SAF, the polymer network of the SAF can be cleaved due to chain scission. An exemplary mechanism is given in the sketch below. The elevated temperature to which the mixture is heated may be at least 10° C. below the decomposition temperature of the salt (leading to radical or radical ion formation or formation of radical ions), or the mixture may be heated to an elevated temperature that is at least the decomposition temperature, or may be heated to an elevated temperature of at least 10° C. above the decomposition temperature of the salt.

The "decomposition temperature", as used herein, is the 10-hour half-life temperature in water, which, for example, is 69° C. for ammonium persulfate and 60° C. for potassium persulfate. Thus, the choice of the most optimal temperature range inter alia depends on the choice of the salt, as different salts (specifically different anions) have different decomposition temperatures. The radicals or radical ions, which have been formed, can react with the SAF, e.g. by reacting with an aliphatic C—H group comprised in the polymer chains of the SAF. As a result of this radical reaction, the polymer chain of the SAF is broken-up and a carbon-centered radical is formed at the broken up SAF polymer chain. The reaction may also take place at a carboxyl group of the SAF, also leading to a carbon-centered radical. Still alternatively or in addition, the reaction may take place at a nitrogen atom, which may be comprised by a cross-linker that has been used to initially make the SAF. If the reaction takes place at a nitrogen atom, a nitrogen-centered radical is formed instead of a carbon-centered radical.

Without wishing to be bound by theory, it is believed that the following reaction scheme exemplarily shows the degradation process of the SAF into soluble polymers (i.e. the "decrosslinked polymer products" below):

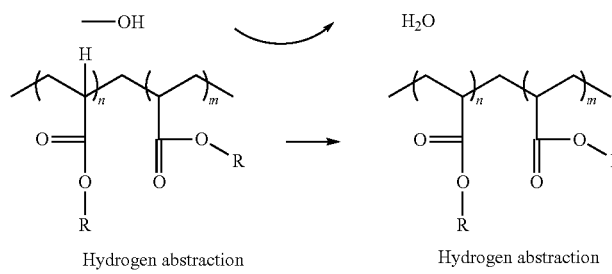

Hydrogen abstraction

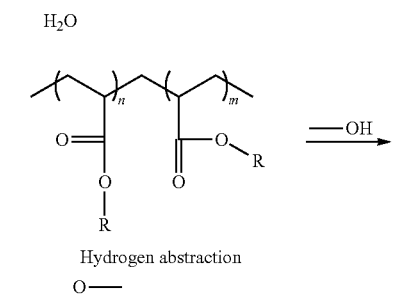

Hydrogen abstraction

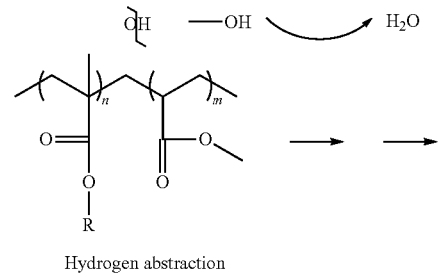

Hydrogen abstraction

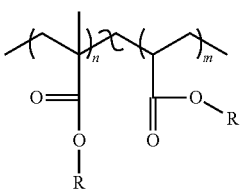

Chain scission

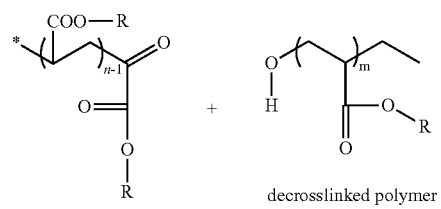

decrosslinked polymer products wherein R is H, or alkaline cation, ammonium cation, or crosslinking residue, or other derivatives of the carboxylic group, such as esters, hydroxy esters etc.

The mixture may be maintained at the elevated temperature for from 10 minutes to 10 hours, preferably from 10 min to 5 h, more preferably from 10 min to 4 h. Shorter times are preferred from an economical perspective. Shorter process times may be obtained e.g. by higher salt concentration, higher temperatures (however, below 200° C.) and/or by optimized mixing of SAF and salt. The time during which the mixture is kept at the elevated temperature also depends on the degree of degradation that is desirable (i.e. average molecular weight of soluble polymers obtained by the process). Generally, once the SAF has been degraded such that no, or only minor amounts of, insoluble SAF are present, indicating that the majority of SAF has been decomposed into soluble polymers, the mixture may no longer need to be maintained at the elevated temperature and the temperature may be decreased to room temperature (25° C.) or below.

The SAF, salt and aqueous carrier may be mixed, e.g. by pre-mixing the salt and the aqueous carrier, such that the salt is, partly or completely, dissolved in the aqueous carrier. The aqueous carrier with the salt dissolved therein can then be mixed with the SAF, such as by spraying the aqueous carrier with dissolved salt onto the SAF. After having sprayed the aqueous carrier with dissolved salt onto the SAF, the mixture may or may not be further mixed, depending e.g. on the amount of SAF, i.e. the thickness of the layer of SAF. If the aqueous carrier with dissolved salt is sprayed onto a thin layer of SAF such that the SAF is appropriately contacted with the aqueous carrier and dissolved salt, further mixing may not be necessary.

Alternatively to pre-mixing the aqueous carrier with the salt to dissolve the salt in the aqueous carrier, it is also possible to provide the aqueous carrier and the salt separately to the SAF, such that the salt is only dissolved in the aqueous carrier after having been mixed with the SAF. Importantly, the salt has to be able to dissolve in the aqueous carrier, either after being contacted with the SAF or, preferably, prior to being contacted with the SAF.

The aqueous carrier may be pre-heated to the elevated temperature prior to mixing the aqueous carrier with the salt and SAF. Such preheating may accelerate the degradation method. Alternatively, the aqueous carrier may be pre-heated, however to a temperature below the elevated temperature prior to mixing with the salt and SAF. Still further alternatively, the aqueous carrier may not be pre-heated prior to mixing with the salt and SAF and the heating to the elevated temperature is done after aqueous carrier, salt and SAF are mixed.

The SAF may be mixed with the aqueous carrier and the salt using for example paddle mixers, ploughshare mixers or kneaders or static rotor mixers. Preferably, the mixture of SAF, aqueous carrier and salt are mixed via high-shear mixing.

If the salt is dissolved in the aqueous carrier prior to mixing with the SAF, the aqueous carrier may be pre-heated to a temperature below the elevated temperature to avoid that the anions prematurely form radicals or radical ions, such that the oxidative salt degrades by self-decomposition and are subsequently no longer available for degradation of the SAF after mixing with the SAF. However, if the salt is dissolved in the aqueous carrier only a short time or immediately before mixing with the SAF, the aqueous carrier may be pre-heated to the elevated temperature before mixing with the SAF. Pre-heating may speed up the time for the salt to dissolve in the aqueous carrier.

Alternatively, or in addition, the SAF may be pre-heated to the elevated temperature or to a temperature below the elevated temperature before mixing with the aqueous carrier and salt. Pre-heated SAF may lead to shorter swelling time of the SAF, thus accelerating the absorption of the aqueous carrier and dissolved salt into the SAF, enabling faster degradation. Faster absorption of the dissolved salt into the SAF may also improve homogenous dispersion of the dissolved salt within the SAF, which may help more homogeneous degradation, thus avoiding that non-degraded pieces of the SAF are left in the mixture.

Still alternatively, the mixture obtained in method step d) may be heated to the elevated temperature only after at least 50 wt %, or at least 70 wt %, or at least 90 wt % or all of the aqueous carrier with salt dissolved therein has been absorbed into the SAF. Some pre-heating to a temperature below the elevated temperature may nevertheless already be done before. The ratio of salt to SAF may be from 0.001 g of salt to 0.05 g of salt per 1 g of SAF, or may be from 0.005 g of salt to 0.03 g of salt per 1 g of SAF, or may be from 0.01 g of salt to 0.03 g of salt per 1 g of SAF.

The ratio of aqueous carrier to SAF may be from 2 g to 30 g of aqueous carrier per 1 g of SAF, or may be from 2 g to 20 g of aqueous carrier per 1 g of SAF, or may be from 5 g to 15 g of aqueous carrier per 1 g of SAF. The SAF may be provided in method step a) dry or swollen to less than 20 g, or less than 15 g, or less than 10 g, or less than 5 g of liquid (such as water or physiological saline) per g of SAF.

The total amount of liquid absorbed into (i.e. comprised in) the SAF in method step e)—including the liquid comprised in the swollen SAF as provided in method step a) (if the SAF is not provided as dry SAF) and the amount aqueous carrier absorbed into and thus comprised by the SAF in method step e), may be from 2 g to 25 g per 1 g of SAF, or may be from 2 g to 20 g per 1 g of SAF, or may be from 5 g to 15 g per 1 g of SAF, or may be from 8 g to 13 g per 1 g of SAF. As used herein, "dry SAF" means that the SAF has a liquid content of less than 0.20 g per g of SAF, preferably less than 0.15 g per g SAF (referred to as "moisture content"). The moisture content of the SAF is measured according to the EDANA Moisture Content Test Method NWSP 230.0.R2 (15).

To ensure that the salt can be used to efficiently degrade the SAF, it is desirable that a significant amount of the aqueous carrier, with the salt being dissolved therein, is absorbed into the SAF in method step d) and e). At least 50 wt %, or at least 60 wt %, or at least 75 wt %, or at least 90 wt %, or 100 wt % of the aqueous carrier provided in step c), with the salt dissolved therein, may be absorbed into the SAF. Absorption of the aqueous carrier, with salt dissolved therein, in method step d) and e) means, that the aqueous carrier, with salt dissolved therein, may be absorbed in method step d) only (this will be the case especially when 100 wt % are absorbed), or predominantly in method step e) (this may be the case if the heating is already starting while the SAF, salt and aqueous carrier are mixed), or a portion of the aqueous carrier with salt dissolved therein is absorbed into the SAF in method step d) while another portion of the aqueous carrier with salt dissolved therein is absorbed into the SAF in method step e).

The SAF provided in method step a) may have a Centrifuge Retention Capacity (CRC) value of from 7 g/g to 40 g/g, or from 10 g/g to 35 g/g, or from 15 g/g to 35 g/g. if recycled SAF, needs to be dried and then measure CRC as measured according to the CRC test method described herein.

If the SAF provided in method step a) is post-consumer recycled SAF, (a sample of) the SAF has to be dried first and then CRC is measured for this sample to determine the CRC of the SAF.

The at least one anion of the salt may be selected from the group consisting of: peroxydisulfate, peroxymonosulfate, peroxydicarbonate, peroxydiphosphate, peroxydiborate, or mixtures thereof.

The at least one cation of the salt is not critical in that typically the cation does not dissociate into radicals. The at least one cation may be chosen to have sufficient solubility in the aqueous carrier, and it should be available at relatively low cost. The at least one cation may be selected from the group consisting of: $Li^+$, $Na^+$, $K^+$, $Rb^+$, $Cs^+$, $NH_4^+$, organically substituted ammonium, $Ca2+$, $Mg2+$, $Sr2+$, $Ba2+$, $Al3+$, transition metal cations of 1+ to 3+ oxidation state, or mixtures thereof (e.g. combinations of different salts having different cations). Most preferred are one or more alkaline cations and/or $NH_4^+$ cations.

At least 50% by total weight of the salt, or at least 60% by weight, or at least 70% by weight, or at least 80% by weight, or at least 90% by weight, or 100% by weight may be an alkaline persulfate.

Hydrogen peroxide may be added in the method. Hydrogen peroxide can help to increase the yield per time of soluble polymers, i.e. the rate of degradation. Hydrogen peroxide can also help to decolorize the decomposed contaminants. The hydrogen peroxide may be added to the SAF as a separate aqueous solution, or it may be added in the aqueous carrier, with or without the salt being dissolved in the aqueous carrier, prior to mixing with the SAF. The amount of hydrogen peroxide used in the method of the present disclosure may be from 10 wt % to 200 wt % based on weight of the salt, or may be from 20 wt % to 100 wt % by weight of the salt, or may be from 30 weight % to 80 wt % by weight of the salt.

Method step e) may be carried out at a pH of 3-7. Typically, no further, special measures are required to obtain a pH in this range. Persulfate radicals, for example, as less stable at pH above 7.

Additives may be used in the method of the present disclosure. For example, small molecular weight alcohols, such as methanol, ethanol, propanol, isopropanol, butanol, ethylene glycol, propylene glycol, glycerin or mixtures thereof may be added to the aqueous carrier provided in method step c) or added to the mixture of method step d). These additives may support the initial wettability of the SAF with aqueous carrier and salt dissolved therein. They may also improve the stability of the aqueous carrier against bacterial contamination. Other additives such as anti-bacterial additives may also be added. The total amount of additives may not be more than 10 wt %, or not more than 8 wt %, or not more than 5 wt %, or not more than 3 wt % based on the weight of the aqueous carrier. In another embodiment, the degradation mixture of method step d) is free of additives, and free of small molecular weight alcohols, such as methanol, ethanol, propanol, isopropanol, butanol, ethylene glycol, propylene glycol, glycerin or mixtures thereof.

The method of the present disclosure can be carried out in a continuous process or as a batch process. Generally, continuous processes are often preferred from a commercial/cost perspective. In a continuous process, the SAF may, for example, be provided in a continuous stream, e.g. on a carrier belt or the like, and aqueous carrier and salt are mixed with the SAF, e.g. by spraying the aqueous carrier and salt (and, optionally, the hydrogen peroxide) onto the SAF. The mixture of SAF, salt and aqueous carrier can be transferred onto a belt after method step d) (e.g. after the aqueous carrier with salt dissolved therein has been partly or fully absorbed into the SAF) and heated in a continuous or batch fashion.

Alternatively, the aqueous carrier can be provided in a batch vessel or similar container (with salt dissolved therein prior to or after providing the aqueous carrier into the vessel. SAF can then be added in the vessel, which already is filled with the aqueous carrier and dissolved salt. and the SAF may be left to absorb the aqueous carrier and salt dissolved therein and, simultaneously or subsequently, the mixture can be heated to the elevated temperature.

For SAF, especially if provided as dry SAF, air tends to tends to be "trapped" between the SAF, i.e. in the interstices between the SAF as they absorb liquid and swell. Hence, the swollen SAF tend to "float" in liquid. As the SAF are degraded, the soluble polymers may sink down in the vessel, where it can (continuously) be removed. To avoid that non-degraded or partly degraded SAF are removed together with the soluble polymers (as some SAF may sink in the vessel), a mesh or the like may be installed within the vessel to hinder the non- or fully degraded SAF from sinking further to the bottom of the vessel, as they will be captured in the mesh until they are more fully degraded and able to pass through the mesh.

Alternatively, the mixture of SAF, salt and aqueous carrier may also be stirred such that the swollen SAF sink towards the ground of a vessel and the soluble polymers, i.e. the product of the method, can be removed from the upper part of the vessel.

The obtained solution with the soluble polymers solubilized therein, may be transferred, e.g. via pumps, to a different vessel, to a pipe, or any other appropriate device, for any posttreatment that may be desired for the solution. Possible posttreatments are filtration, desalination, concentration via evaporation, or numerous other treatments.

The energy consumption of the degradation process inter alia depends on the elevated temperatures. The higher the elevated temperature, the higher the energy consumption per time (i.e. a short process time at higher elevated temperature may overall require less energy than a relatively lower elevated temperature with relatively longer process time). For example, the energy consumption is about 3.5 MJ/kg dry SAF for an elevated temperature of about 100° C. for a batch process in an insulated vessel, i.e. a process where the heating to the elevated temperature is done only once.

The SAF provided in method step a) may be in particulate form. The SAF provided in the method can be virgin SAF, post-consumer recycled SAF (PCR SAF), post-industrial recycled SAF (PIR SAF), or a combination of those materials. "Post-consumer SAF" and "post-consumer recycled SAF" (PCR SAF) are used herein interchangeably and, as used herein, refer to SAF which has been comprised by an AHP and the AHP has been used by a consumer (e.g. worn by an incontinent user). After use, the AHP is recycled and the PCR SAF is isolated from the AHP. However, for the method of the present disclosure, it is not necessary that the SAF is purified such that no other components of the post-consumer AHP are comprised by the post-consumer SAF which is provided for the method of the disclosure.

"Post-industrial SAF" and "post-industrial recycled SAF" (PIR SAF) are used herein interchangeably and, as used herein, refer to SAF which may or may not have been comprised by an AHP. The PIR SAF has not been previously used, e.g. it was not comprised by an AHP which has been used by a consumer. Instead, the PIR SAF may be derived from AHPs which have been sorted out during production, e.g. because they are defective. The PIR SAF may also have been sorted out during SAF production, e.g. because they do not meet the required performance targets (such as capacity, whiteness or the like). Thus, for the latter scenario, the PIR SAF was not previously comprised by an AHP.

The typical properties of SAF are mechanical properties, swelling capacity, and centrifuge retention capacity (CRC) measured according to the test method set out herein.

Also, the SAF includes from more than 25 weight-% to less than 95 weight-% of other co-monomers (i.e. other than acrylic acid). Suitable co-monomers are monomeric groups e.g. comprised of/consisting of methyl acrylate, methyl methacrylate, ethyl (meth) acrylate 2-ethyl hexyl (meth) acrylate, or polyacrylamides, polyvinyl alcohol, ethylene maleic anhydride copolymers, polyvinyl ethers, hydroxypropylcellulose, polyvinlmorpholinone, and polymers and copolymers of vinyl sulfonic acid, polyvinyl amines, polyallylamines, polyvinylpyrridine, and the like. Other suitable polymers in SAF include hydrolyzed acrylonitrile grafted starch, acrylic acid grafted starch, and isobutylene maleic anhydride copolymers and mixtures thereof. The SAF are crosslinked to render the material substantially water insoluble. Preferred monomers are methyl (meth) acrylate, and/or monomers comprising a hydroxylic group, e.g. hydroxyalkyl (meth) acrylates, e.g. hydroxyethyl methacrylate, tripropyleneglycol mono acrylate, 5 glyceryl monoacrylate etc. The SAF can comprise/consist of polymers formed of two kinds of monomers (including acrylic acid) or more preferably of three or more kinds of monomers.

The SAF may have a sodium level as amount of Na in wt % greater than about 8 wt %, or a sodium level as amount of Na in wt % of from 10 wt % to 20 wt %, or from 15 wt % to 18 wt %. In yet another embodiment, the SAF has or a sodium level as amount of Na in wt % below 12 wt % (for the avoidance of doubt, weight-%, wt % and wt-% are used herein interchangeably). Also, or alternatively, the SAF may have a potassium level as amount of K in wt % greater than about 13.5 wt %, or a potassium level as amount of K in wt % of from 17 wt % to 34 wt %, or from 25.5 wt % to 30.6 wt %. The SAF may have a potassium level as amount of K in wt % below 20.4 wt %. The Na content as well as the K content can for example by measured using the Inductively Coupled Plasma (ICP) analytical technique, as it is well known to those skilled in the art.

Alternatively, the SAF may have a ammonium level as amount of $NH_4^+$ in wt % of greater than about 6.3 wt %, or a ammonium level as amount of $NH_4^+$ in wt % of from 7.8 wt % to 15.7 wt %, or from 11.7 wt % to 14.1 wt %. The SAF may have a ammonium level as amount of $NH_4^+$ in wt % of below 9.4 wt %.

The SAF provided to the method of the present disclosure may be in dry form or may be partly swollen with water, saline, or urine (e.g., urine in PCR SAF). Hence, the SAF may be swollen to from 0.05 g/g to 20 g/g with water, saline or urine, preferably to from 0.05 g/g to 15 g/g, more preferably to from 0.10 g/g to 10 g/g, more preferably to from 0.20 g/g to 5 g/g, and even more preferably to from 0.50 g/g to 2 g/g. Completely dry (i.e. 0 g/g of water, saline or urine) may be less advantageous for the method of the present disclosure, because it takes longer for completely dry SAF to absorb the aqueous carrier with the salt dissolved therein. On the other hand, SAF which is excessively swollen (or even fully swollen) when provided to the method, may also lead to an increase in time until the salt dissolved in the aqueous carrier is absorbed into the SAF. The SAFs provided to the method may have an absorbent capacity CRC (measured as Centrifuge Retention Capacity "CRC" as described herein) of from 70 g/g to 40 g/g.

The amount of aqueous carrier provided in method step c) may be such that the SAF provided in step a) are able to swell to at least 20%, or at least 30%, 50%, or at least 60% or at least 70%, or at least 80% of their CRC upon absorption of all aqueous carrier provided. If the SAF not provided dry but pre-swollen (see further details below), the less aqueous carrier is required to obtain the desired degree of SAF load, i.e. the desired CRC.

Upon absorption of liquid, the polymer chains within the polymer network of the SAF start to disentangle. Such disentanglement will make the polymer network easier accessible for the radicals or radical ions formed from the salt. Hence, degradation is improved. If the amount of aqueous carrier provided in step c) does not enable the SAF to swell to at least 20% of their CRC upon absorption of the aqueous carrier, the polymer chains within the polymer network of the SAF may not be able to sufficiently disentangle, making degradation slower or overall less effective.

For the degradation method of the present disclosure, the use of post-consumer SAF may be beneficial over the use of virgin SAF: The polymer chains in the polymer network of a previously swollen and then at least partly red-dried SAF have already been disentangled. Re-swelling and thus anewed disentanglement is believed to be faster versus swelling of virgin SAF.

If post-consumer SAF is provided in partly swollen form for the method of the present disclosure, it is also advantageous that there is no need to completely dry the SAF for use in the method, given that drying of post-consumer SAF is time- and energy consuming. However, post-consumer SAF may be sterilized prior to providing it to the method of the present disclosure.

If post-consumer SAF or post-industrial SAF are isolated from AHPs to be provided for the method of the present disclosure, the SAF does not necessarily need to be purified such that no other components of the AHPs are present. The SAF may be contaminated with other components of the AHP, such as synthetic fibrous materials or films (e.g. fibers, sheets, films, and fibrous layers), cellulose fibers, adhesives, inks, dyes, surfactants etc. The amount of these contaminants may not be more than 20% by weight of the mixture of SAF and contaminants, or may not be more than 15% by weight, or not more than 10% by weight, or not more than 5% by weight, or not more than 2% by weight, or not more than 1% by weight.

If the post-consumer SAF is still swollen, e.g. with urine or other liquid, this urine or other liquid comprised by the SAF is not taken into consideration when calculating the amount of contaminants by weight of the mixture of SAF and contaminants.

If the SAF is provided as dry SAF for the present disclosure, the fiber size of the post-consumer or post-industrial SAF may optionally be reduced, e.g., by cutting, milling, grinding or other suitable means. This could result in a reduced fiber length of not more than about 50% of the length of the un-reduced fiber length, or from about 10% to about 70% of the length of the un-reduced fiber length.

If the SAF is provided in pre-swollen form, e.g. as post-consumer SAF, which was not or only partly dried after recycling, the SAF may be subjected to comminution to increase the surface area of the SAF, which may enable faster absorption of the aqueous carrier with the salt dissolved therein. Such faster absorption may, in turn, lead to faster degradation of the SAF. Comminution may, for example, be done by wet grinding, dry milling or cutting.

Smaller fiber sizes can help fast and homogeneous absorption of the dissolved salt into the SAF, leading to faster and more complete degradation of the SAF. Furthermore, smaller fiber sizes, especially for entangled fibers such as in nonwoven, may help mixing of SAF with the salt and the aqueous carrier.

Optional method step f) of separating the soluble polymers in the aqueous solution from other compounds and components in the mixture:

Once the SAF has been decomposed into soluble polymers, the soluble polymers may be separated from the mixture of (possibly remaining non-decomposed) SAF, salt, aqueous carrier and optional further components (such as hydrogen peroxide and/or small molecular weight alcohols). The mixture may still comprise a certain amount of non-decomposed SAF, which may be present in the mixture as solid, insoluble component.

The soluble polymers can be extracted from the mixture via a number of processes. Non-limiting examples of these processes are water evaporation, filtration of the soluble polymers, water extraction, etc. Also, the salts can be removed via any desalination technique known to those skilled in the art. Non-limiting examples of desalination processes are membrane processes (e.g. reverse osmosis, forward osmosis, electrodialysis reversal (EDR), nanofiltration, etc.), freezing desalination, solar desalination, geothermal desalination, ion exchange, wave powered desalination, etc. The same techniques can generally also be applied to remove other small molecular weight compounds in the mixture, e.g. other typical compounds of the post-consumer AHPs such as adhesives, inks, dyes, surfactants, and degradation products of these compounds.

For example, filtration may be used to eliminate the solid compounds and components from the mixture, i.e. for method step d) of separating the soluble polymers in the aqueous solution from other compounds and components in the mixture obtained by step c). Solid compounds and components may be remaining insoluble SAF and other components of post-consumer AHPs, such as synthetic fibrous materials or films (fibers, sheets/films/fibrous layers) and cellulose. Notably, polyolefins (e.g. polypropylene, polyethylene) comprised by the other components of post-consumer AHPs, such as the synthetic fibrous materials or films, are not soluble or swellable in the aqueous carrier. They may only react with the salt to a negligible extent, i.e., the polyolefins are not or only insignificantly degraded by the method of the present disclosure. The same apply for PET, which may also be comprised by the synthetic fibrous materials or films. Thus, those materials will remain as solid components in the mixture and may be filtered out.

PEG, another typical component in post-consumer AHPs, e.g., comprised in surfactants, is degraded by the method of the present disclosure. However, the PEG is typically degraded into molecules of relatively small molecular weight, which is significantly smaller than the molecular weight of the soluble polymers. Hence, the small molecular weight reaction products of PEG can be separated from the soluble polymers, e.g. by the techniques described above.

Alternatively, or in addition, the mixture of soluble polymers, (possibly remaining parts of) SAF, salt and aqueous carrier, which may comprise compounds of post-consumer AHPs, may also be mixed in a co-solvent in which the soluble polymers are not soluble such that the soluble polymers will precipitate to isolate it from the mixture. Prior to such mixing in a co-solvent, solid compounds in the mixture may be removed by filtration.

The soluble polymers obtained by the degradation method of the present disclosure may have varying molecular weight. The soluble polymers may or may not comprise oligomers. Preferably, the soluble polymers do not comprise oligomers, i.e. soluble polymers relate to polymers only. The average molecular weight Mw of the soluble polymers may be up to 10 MDa, or up to 5 MDa. The average molecular weight Mw of the soluble polymers may be at least 10 kDa, or at least 20 kDa, or from 30 kDa to 1 MDa. The soluble polymers may be linear or branched. However, the soluble polymers are not cross-linked and hence they are soluble, preferably water soluble.

The soluble polymers obtained by the method of the present disclosure can be used or derivatized into materials for other applications such as adhesives, coatings, water treatment, etc. In one embodiment, the soluble polymers, either as is or derivatized, are used in an adhesive. In yet another embodiment, the soluble polymers, either as is or derivatized, are used in fabric care applications. In even yet another embodiment, the soluble polymers, either as is or derivatized, are used in water treatment applications.

In one embodiment, the feed stream comprises SAF and an oxidative water-soluble salt; and wherein the salt comprises at least on cation and at least one anion. In another embodiment, the feed stream comprises SAF and an oxidative water-soluble salt; wherein the salt comprises at least on cation and at least one anion; and wherein the anion is selected from the group consisting of peroxydisulfate, peroxymonosulfate, peroxydicarbonate, peroxydiphosphate, peroxydiborate, and combinations thereof. In yet another embodiment, the feed stream comprises SAF and an oxidative water-soluble salt; wherein the salt comprises at least on cation and at least one anion; wherein the anion is selected from the group consisting of peroxydisulfate, peroxymonosulfate, peroxydicarbonate, peroxydiphosphate, peroxydiborate, and combinations thereof; and wherein the cation is selected from the group consisting of $Li^+$, $Na^+$, $K^+$, $Rb^+$, $Cs^+$, $NH_4^+$, organically substituted ammonium, $Ca^{2+}$, $Mg^{2+}$, $Sr^{2+}$, $Ba^{2+}$, $Al^{3+}$, transition metal cations of 1+ to 3+ oxidation state, and combinations thereof.

In one embodiment, the feed stream is subjected to a biological process that results in a negative decadic logarithm of the viscosity ratio between the feed and product streams of higher than about 2. The biological method may entail an enzyme or microorganism that cleave bonds present in the SAF, such as carboxyl ester bonds linking soluble polymers to the poly(ethylene glycol) (PEG) cross-linker or ether bonds present in the PEG cross-linker. The break-down of such bonds may result in a reduction of the viscosity of the feed stream and may allow increased flow rates and/or decreased pressure as the feed stream flows in the extensional flow device.

In one embodiment, the feed stream comprises SAF and an enzyme; and wherein the enzyme has activity against the SAF. Non-limiting examples of enzymes are hydrolases and oxidases. Non-limiting examples of hydrolases are ester hydrolases, carboxyl ester hydrolases, ether hydrolases, cutinases, lipases, esterases, and carboyl-esterases. In another embodiment, the feed stream comprises SAF and an ester hydrolase. In yet another embodiment, the feed stream comprises SAF and an ether hydrolase. Non-limiting examples of oxidases are peroxidases, peroxygenases, laccases, lipoxygenases, peroxidases, peroxygenases, mono-oxygenases, di-oxygenases, and hydroxilases. In even yet another embodiment, the enzyme is a cocktail of enzymes. In one embodiment, the feed stream comprises SAF, an enzyme, and one or more of a cofactor, a co-substrate, and a supplement.

In another embodiment, the feed stream comprises SAF and a cocktail of enzymes. In yet another embodiment, the feed stream comprises SAF and an enzyme; wherein the enzyme contains multiple catalytic activities; and wherein the activities are selected from the group consisting of carboxyl esterase, ether hydrolase, and oxidase. The enzymes can be naturally occurring or engineered to improve properties, such as substrate specificity, turnover, temperature stability, and pH stability. For example, hydrogen peroxide may be added to peroxidase family enzymes or electron-shuttle compounds such as, but not limited to, 1-Hydroxybenzotriazole (HBT, synthesis grade), N-hydroxynaphthalimide (IMD-4, 99%), N-hydroxy-5-norbornene-2,3-dicarboxylic acid imide (NHND, 97%), N-hydroxyphthalimide (NPI, 97%), 2,2'-Azino-bis(3-ethylbenzothiazoline-6-sulfonic acid), ABTS, or N,N'-Dihydroxy-1,4,5,8-naphthaldiimide, IMD-8.

Non-limiting examples of bacterial microorganisms that break down SAF in the feed stream are *Bacillus cereus, Pseudomonas aureginosa, P. fluorescens, P. stutzeri,* and *Alcaligenes* glycovorans. A non-limiting example of fungal microorganisms that break down SAF is *Phanerochaete chrysosporium*. In another embodiment, a combination or consortium of organisms such as those listed herein is utilized to breakdown the polymer in the feed stream. Without wishing to be bound by any theory, applicants believe that the microorganisms used in the biological treatment express and produce at least one enzyme, such as the enzyme examples listed herein that act on specific bonds of the SAF in the feed stream. The organisms may also produce cofactors, co-substrates, and/or allosteric modulators that enhance the enzymatic activity.

IV Product Stream

The feed stream flows into the inlet of the extensional device and produces a product stream at the outlet of the extensional flow device. In one embodiment, the product stream comprises soluble polymers. In another embodiment, the product stream comprises soluble polymers and SAF.

In one embodiment, the soluble polymers have a weight-average molecular weight less than about 5,000,000 g/mol. In another embodiment, the soluble polymers have a weight-average molecular weight less than about 2,000,000 g/mol. In yet another embodiment, the soluble polymers have a weight-average molecular weight less than about 1,000,000 g/mol. In even yet another embodiment, the soluble polymers have a weight-average molecular weight less than about 500,000 g/mol. In one embodiment, the soluble polymers have a weight-average molecular weight less than about 300,000 g/mol. In another embodiment, the soluble polymers have a weight-average molecular weight less than about 200,000 g/mol. In yet another embodiment, the soluble polymers have a weight-average molecular weight less than about 100,000 g/mol. In even yet another embodiment, the soluble polymers have a weight-average molecular weight less than about 30,000 g/mol.

In one embodiment, the soluble polymers have a weight-average molecular weight between about 1,000,000 g/mol and about 5,000,000 g/mol. In another embodiment, the soluble polymers have a weight-average molecular weight between about 500,000 g/mol and about 2,000,000 g/mol. In yet another embodiment, the soluble polymers have a weight-average molecular weight between about 100,000 g/mol and about 1,000,000 g/mol. In even yet another embodiment, the soluble polymers have a weight-average molecular weight between about 150,000 g/mol and about 500,000 g/mol. In one embodiment, the soluble polymers have a weight-average molecular weight between about 90,000 g/mol and about 300,000 g/mol. In another embodiment, the soluble polymers have a weight-average molecular weight between about 20,000 g/mol and about 200,000 g/mol. In yet another embodiment, the soluble polymers have a weight-average molecular weight between about 10,000 g/mol and about 100,000 g/mol.

In one embodiment, the soluble polymers have a polydispersity index (PDI) less than about 10. In another embodiment, the soluble polymers have a PDI less than about 6. In yet another embodiment, the soluble polymers have a PDI less than about 4. In even yet another embodiment, the soluble polymers have a PDI less than about 2. PDI is the ratio of the weight-average molecular weight to the number-average molecular weight, and these molecular weights are measured by GPC (described in the Methods section VII) as it is known to those skilled in the art.

The viscosity of the product stream is typically measured with either a parallel plate fixture in oscillatory mode or a cup and bob fixture in steady mode. The oscillatory viscosity reported typically corresponds to 1 rad/s, and the steady viscosity reported typically corresponds to a shear rate of 4 $s^{-1}$. Depending on the soluble polymer concentration and molecular weight, the viscosity of the product stream can be as low as 1 mPa·s (or equivalently, 1 cP; i.e., the viscosity of water).

The ratio of the viscosity of the product stream to the viscosity of the feed stream is the viscosity reduction ratio (or simply, viscosity ratio). It indicates the extent of the SAF degradation to soluble polymers by the UV flow system. The negative decadic logarithm of the viscosity ratio measures the orders of magnitude change between the viscosity of the feed stream and the product stream. In one embodiment, the feed stream has a viscosity; the product stream has a viscosity; the ratio of the viscosity of the product stream to the viscosity of the feed stream is the viscosity ratio; and the negative decadic logarithm of the viscosity ratio is less than about 6. In another embodiment, the feed stream has a viscosity; the product stream has a viscosity; the ratio of the viscosity of the product stream to the viscosity of the feed stream is the viscosity ratio; and the negative decadic logarithm of the viscosity ratio is less than about 4. In yet another embodiment, the feed stream has a viscosity; the product stream has a viscosity; the ratio of the viscosity of the product stream to the viscosity of the feed stream is the viscosity ratio; and the negative decadic logarithm of the viscosity ratio is less than about 2.

Soluble polymers from the product stream can be derivatized into materials for various applications, such as, adhesives, coatings, water treatment, etc. In one embodiment, soluble polymers from the product stream, either as is or derivatized, are used as an adhesive. In yet another embodiment, soluble polymers from the product stream, either as is or derivatized, are used in fabric care applications. In even yet another embodiment, soluble polymers from the product stream, either as is or derivatized, are used in water treatment applications.

In one embodiment, soluble polymers from the product stream are used as a ply glue in paper products. In another embodiment, soluble polymers from the product stream are used as a ply glue in paper towel products. In yet another embodiment, soluble polymers from the product stream are used as a ply glue in toilet paper products. In even yet another embodiment, soluble polymers from the product stream are used as ply glue in paper products has $M_w$ greater than about 350 kDa. In one embodiment, soluble polymers from the product stream are used as ply glue in paper products has $M_w$ between about 400 kDa and about 500 kDa.

In another embodiment, soluble polymers from the product stream are used as a glue between the paper core and paper towel products. In even another embodiment, soluble polymers from the product stream are used as a glue between the paper core and toilet paper products.

Soluble polymers can be extracted from the product stream via a number of processes. Non-limiting examples of these processes are water evaporation, soluble polymers filtration, water extraction, etc. Also, salts present in the product stream from the use of SAF in AHPs can be removed via any desalination technique known to those skilled in the art. Non-limiting examples of desalination processes are membrane processes (e.g. reverse osmosis, forward osmosis, electrodialysis reversal (EDR), nanofiltration, etc.), freezing desalination, solar desalination, geothermal desalination, ion exchange, wave powered desalination, etc.

V Recycled SAF

Soluble polymers from the product stream can be fed into the process to make SAF using acrylic acid, thus producing recycled SAF. In one embodiment, the soluble polymers are used to produce a recycled SAF.

In one embodiment, the recycled SAF has a CRC as measured using the CRC test method described herein, and wherein the CRC is between about 7 g/g and about 45 g/g. In another embodiment, the recycled SAF has a CRC, and wherein the CRC is between about 10 g/g and about 35 g/g. In yet another embodiment, the recycled SAF has a CRC, and wherein the CRC is between about 15 g/g and about 35 g/g.

VII Methods

NMR Content Method

The NMR Content Method is used to determine the ratio on a molar basis of functional groups with different NMR signals such as alkene terminal moieties, alkoxy groups (—O—$CHR_1$— with $R_1$ one of the group H, alkyl, aryl, heteroaryl, alkoxy or halogene), aliphatic groups (—$CHR_1$— with $R_1$ one of the group H, alkyl, aryl, heteroaryl or halogene) and/or other $^1$H-NMR active groups.

In this method, proton NMR spectroscopy is used to analyze a sample of soluble material in deuterated water, and peaks of different $^1$H-NMR domains are integrated, and ratioed to determine the mole percent of protons of the functional groups or different $^1$H-NMR domains, respectively.

The soluble polymer is dried in a vacuum oven (Heraeus Vacutherm type, Thermo Scientific™) at 40° C. and pressure between 10 and 50 mbar for 3 hours. Any small molecular weight alcohol, ester or ether is removed from the soluble polymer.

A flowable solution less than 10% by weight sample dissolved in $D_2O$ and pH adjusted to 5.5-6.5 is prepared. The solution is transferred to an NMR glass grade tube and placed in the sample holder (bore) of a proton NMR instrument. An example of a suitable instrument is a Bruker NMR device with 400 MHZ field strength. Instruments of other makes and other field strengths, even including "low-field" instruments operating as low as 60 MHz, can successfully be used to perform this method. A noesy-presat sequence is used to acquire the data and suppress the residual water signal. One of skill will be familiar with appropriate choice of other specific data collection parameters. Appropriate parameters used with the exemplary 400-MHz Bruker instrument above are: acquisition time (FID length) of 4.1 s, relaxation time of 8 s, 90-degree pulse widths, spectral width of 20 ppm, 64 k points in the FID, and 64 repetition scans used. In the Fourier transform step, exponential apodization is used with 0.3-Hz line broadening, and the spectrum is phased into absorption. A spline baseline correction is used to ensure flat baseline on either side of peaks to be integrated.

The following peak domains are typically used for the content determination and integrated:
1) One of two terminal alkene protons at chemical shifts in the range of appr. 5-6 ppm, typically one terminal alkene proton at appr. 5.35 ppm +/-0.5 ppm. (To confirm the identity of such proton peak as terminal alkene proton a standard edited $^1$H-$^{13}$C HSQC sequence can be used (following e.g. W. Willker, D. Leibfritz, R. Kerssebaum & W. Bermel, Magn. Reson. Chem. 31, 287-292 (1993)) to determine that the alkene signals seen in the 1D-1H spectrum are both attached to the same methylene (secondary) carbon (—$CH_2$).). The resulting integral is called "integral_alkene".

2) alkoxy protons at chemical shifts in the range of appr. 3.2-3.8 ppm, typically at appr. 3.6 ppm. The resulting integral is called "integral_3.6". In case more than one signal appears at appr. 3.6 ppm, i.e. in the range of appr. 3.2-3.8 ppm, the signal with the largest integral is chosen to get "integral_3.6".

3) methylene protons of aliphatic CH-groups, typically at ca. 1.5 ppm and 2.1 ppm, or at ca. 1.8 ppm. The resulting integral is called "integral_CH".

4) other aliphatic groups at chemical shifts in the range of appr. 1.0-2.6 ppm.

5) other groups or peaks of different $^1$H-NMR domains can be analyzed as well, provided that they
   a) are separated signals,
   b) have peak maxima are at a distance of at least 0.5 ppm.

6) The peaks in the NMR spectrum corresponding to class 1), 2), 3) and/or 4) are identified and, if present, integrated. If no such peak is present, this reported as no measurable content of class 1), 2), 3) or 4), respectively. As known by the person skilled in the art, the integration ranges from baseline (start of signal) to baseline (end of signal), or in case of broad and/or complex the boarders of integration result from the start of the next neighbouring signal.

The ratio "ratio 3.6:CH" is calculated via the following formula:

ratio 3.6:CH=integral_3.6/integral_CH ratio 3.6:CH is a unitless number an represents the ratio of protons at ca. 3.6 ppm The content of alkene "% alkene" is calculated via the following formula:

% alkene=[integral_alkene/(integral_alkene+integral_3.6+integral_CH)]*100%

The content of methylene "% CH" is calculated via the following formula:

% CH=[integral_CH/(integral_alkene+integral_3.6+integral_CH)]*100%

The content of protons at about 3.6 ppm (such as alkoxy protons) %3.6 ppm" is calculated via the following formula:

%3.6=[integral_3.6/(integral_alkene+integral_3.6+integral_CH)]*100%

The ratio "ratio 3.6:CH" is reported to the nearest 0.001.
The content of alkene, methylene and protons at about 3.6 ppm are reported in % to the nearest 0.01%.

Centrifuge Retention Capacity (CRC) Test Method

Capacity of the superabsorbent fibers is determined according to the Centrifuge Retention Capacity (CRC) test method as set out in EDANA NWSP 241.0.R2(19). In deviation from EDANA NWSP 241.0.R2(19) the sampling (chapter 8 in EDANA NWSP 241.0.R2(19)) for the superabsorbent fibers, superabsorbent nonwovens and/or the superabsorbent core is as following:

The superabsorbent fibers, superabsorbent nonwovens and/or the superabsorbent core are cut into pieces with approximately 5 mm as largest dimension. The cutting can e.g. be done manually with scissors. Care is taken that the fibrous structure (the core, the nonwoven or the bulk of fibers) is not majorly compressed before or during the cutting process. This ensures sufficient void space between the superabsorbent fibers, so they can be predominately wetted by the swelling medium at the entire surface area.

Further deviations from or additions to EDANA NWSP 241.0.R2(19) in the procedure (chapter 9.1-9.5 in EDANA NWSP 241.0.R2(19)) for the superabsorbent fibers, superabsorbent nonwovens and/or the superabsorbent core are as following:

The sample for the measurement is taken carefully, e.g. with a lab pincet, to put it into the teabag. With a lab pincet, the fibers are carefully distributed in the teabag to avoid lumps and fiber lumps, if any, are carefully opened.

When sealing the teabag, care is taken that no material of the superabsorbent fibers, superabsorbent nonwovens and/or the superabsorbent core is in the area of the seal. This ensures a complete and sufficiently strong sealing of the teabag.

All other items of the test method are executed as set out in EDANA NWSP 241.0.R2(19).

Total Energy Calculations

The total energy is the electric energy that is supplied to the extensional flow device and is based on the voltage and amperage of the device, and the residence time of the feed stream. The extensional flow device typically calculates the total energy from the motor torque and speed, and residence time of the feed stream in the extensional flow device. The total energy per unit mass of SAF is then calculated from the total energy and the amount of SAF that is in the feed stream.

Specific Energy Calculations

The specific energy is the energy dissipated in the feed stream, it is used to convert SAF to soluble polymers, and is based on the pressure drop in the feed stream as it flows through the extensional flow system. As an example, if the pressure drop in the feed stream is 4945 psi (341 bar), the volume of the feed stream is 400 mL, and the feed stream density is 1 g/mL, then the specific energy is calculated as: (341 (bar)×0.4 (L))/(400 (mL)×0.025 (g SAF/g)×1 (g/mL))= 1.36 MJ/kg SAF.

Molecular Weight Distribution (MWD) Analysis

It is done using Gel Permeation Chromatography (GPC) with Multi-Angle Light Scattering (MALS) and Refractive Index (RI) detection. Samples are made at concentration of 1 mg/mL in 0.1M $NaNO_3$/0.02 wt % Sodium Azide ($NaN_3$) with a gentle mixing at room temperature for overnight hydration. Samples are then filtered through a 0.8 μm filter before the GPC-MALS/RI analysis. The absolute MWD distribution is calculated using dn/dc value of 0.15.

The foregoing description is given for clearness of understanding only, and no unnecessary limitations should be understood therefrom, as modifications within the scope of the invention may be apparent to those having ordinary skill in the art.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, comprising any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for degrading superabsorbent fibers (SAF) to soluble polymers, wherein the soluble polymers comprise from 5 weight-% to 75 weight-% of polymerized acrylic acid monomer units based on the total weight of the soluble polymers, the method comprising:
flowing a feed stream comprising the SAF into an inlet of an extensional flow device and producing a product stream comprising the soluble polymers at an outlet of the extensional flow device; wherein the feed stream comprises the SAF at a concentration greater than about 1 wt %; wherein the feed stream has a residence time in the extensional flow device of less than about 120 s; and wherein the degradation of the SAF to the soluble polymers requires a total energy of less than about 50 MJ/kg SAF.

2. The method of claim 1, wherein the residence time is less than about 60 s.

3. The method of claim 1, wherein the total energy is less than about 16 MJ/kg SAF.

4. The method of claim 1, wherein the feed stream comprises SAF and water.

5. The method of claim 1, wherein the feed stream comprises SAF and hydrogen peroxide.

6. The method of claim 1, wherein the SAF has a sodium level as amount of Na of about 10 wt to about 20 wt %.

7. The method of claim 1, wherein the feed stream has a viscosity; wherein the product stream has a viscosity; wherein the ratio of the viscosity of the product stream to the viscosity of the feed stream is the viscosity ratio; and wherein the negative decadic logarithm of the viscosity ratio is less than about 6.

8. The method of claim 1, wherein the feed stream has a viscosity; wherein the product stream has a viscosity; wherein the ratio of the viscosity of the product stream to the viscosity of the feed stream is the viscosity ratio; and wherein the negative decadic logarithm of the viscosity ratio is less than about 4.

9. The method of claim 1, wherein the soluble polymers have a weight-average molecular weight less than about 2,000,000 g/mol.

10. The method of claim 1, wherein the soluble polymers have a weight-average molecular weight less than about 1,000,000 g/mol.

11. The method of claim 1, wherein the soluble polymers have a polydispersity index (PDI) less than about 4.

12. The method of claim 1, wherein the SAF have a Centrifuge Retention Capacity as measured using the CRC test method herein of at least 15 g/g.

13. A method for degrading superabsorbent fibers (SAF) to soluble polymers, wherein the soluble polymers comprise from 5 weight-% to 75 weight-% of polymerized acrylic acid monomer units based on the total weight of the soluble polymers, the method comprising:
flowing a feed stream comprising the SAF into an inlet of an extensional flow device and producing a product stream comprising the soluble polymers at an outlet of the extensional flow device; wherein the feed stream comprises water and SAF at a concentration greater than about 1 wt %; wherein the feed stream has a residence time in the extensional flow device of less than about 120 s; wherein the degradation of the SAF to the soluble polymers requires a total energy of less than about 16 MJ/kg SAF; and
wherein the soluble polymers have a weight-average molecular weight less than about 1,000,000 g/mol.

14. A method for degrading superabsorbent fibers (SAF) to soluble polymers, wherein the soluble polymers comprise from 5 weight-% to 75 weight-% of polymerized acrylic acid monomer units based on the total weight of the soluble polymers, the method comprising:
flowing a feed stream comprising the SAF into an inlet of an extensional flow device and producing a product stream comprising the soluble polymers at an outlet of the extensional flow device; wherein the feed stream comprises water and SAF at a concentration greater than about 5 wt %; wherein the feed stream has a residence time in the extensional flow device of less than about 120 s; wherein the degradation of the SAF to the soluble polymers requires a total energy of less than about 16 MJ/kg SAF; and wherein the soluble polymers have a weight-average molecular weight less than about 1,000,000 g/mol.

15. The method of claim 14, wherein the feed stream has a viscosity; wherein the product stream has a viscosity; wherein the ratio of the viscosity of the product stream to the viscosity of the feed stream is the viscosity ratio; and wherein the negative decadic logarithm of the viscosity ratio is less than about 4.

16. The method of claim 14, wherein the SAF has a sodium level as amount of Na of between about 10 wt % and about 20 wt %.

17. The method of claim 14, wherein the feed stream comprises SAF and hydrogen peroxide.

18. The method of claim 14, wherein the SAF are provided as loose fibers.

19. The method of claim 14, wherein the SAF are provided in the form of a nonwoven web, wherein the nonwoven web comprises SAF.

20. The method of claim 19, wherein the nonwoven web is cut, shred or milled prior to being provided to the method or while carrying out the method.

* * * * *